(12) United States Patent
Zhang et al.

(10) Patent No.: US 12,107,974 B1
(45) Date of Patent: Oct. 1, 2024

(54) ENCRYPTION METHOD AND APPARATUS

(71) Applicant: INSTITUTE OF MICROELECTRONICS OF THE CHINESE ACADEMY OF SCIENCES, Beijing (CN)

(72) Inventors: Feng Zhang, Beijing (CN); Yiming Wang, Beijing (CN); Qirui Ren, Beijing (CN)

(73) Assignee: INSTITUTE OF MICROELECTRONICS OF THE CHINESE ACADEMY OF SCIENCES, Beijing (CN)

( * ) Notice: Subject to any disclaimer, the term of this patent is extended or adjusted under 35 U.S.C. 154(b) by 0 days.

(21) Appl. No.: 17/756,314

(22) PCT Filed: Apr. 19, 2021

(86) PCT No.: PCT/CN2021/088158
§ 371 (c)(1),
(2) Date: May 22, 2022

(87) PCT Pub. No.: WO2022/198732
PCT Pub. Date: Sep. 29, 2022

(30) Foreign Application Priority Data

Mar. 23, 2021 (CN) .......................... 202110308565.6

(51) Int. Cl.
*H04L 9/32* (2006.01)
*H04L 9/08* (2006.01)

(52) U.S. Cl.
CPC .......... *H04L 9/3278* (2013.01); *H04L 9/0869* (2013.01); *H04L 2209/12* (2013.01)

(58) Field of Classification Search
CPC . H04L 9/3278; H04L 9/0869; H04L 2209/12; H04L 9/08; H04L 9/32
See application file for complete search history.

(56) References Cited

U.S. PATENT DOCUMENTS

2008/0144819 A1* 6/2008 Gehrmann ............ H04L 9/0643
380/46
2019/0122727 A1* 4/2019 Le Gallo-Bourdeau .....................
G06F 17/16

FOREIGN PATENT DOCUMENTS

CN 109522753 A 3/2019
CN 111339579 A 6/2020

OTHER PUBLICATIONS

International Search Report prepared by the State Intellectual Property Office of the P.R. China for PCT/CN2021/088158, Dec. 23, 2021, 4 pages.
Written Opinion prepared by the State Intellectual Property Office of the P.R. China for PCT/CN2021/088158, Dec. 23, 2021, 4 pages.

* cited by examiner

*Primary Examiner* — Quazi Farooqui
(74) *Attorney, Agent, or Firm* — Syncoda LLC; Feng Ma

(57) ABSTRACT

An encryption method includes: receiving cipher data which is binary data; determining target components in a resistive memory array according to values of respective bits in the cipher data; determining current values generated by respective columns of components according to the target components; and generating key data according to the current values generated by the respective columns of components. The present disclosure can effectively reduce computing power and power consumption of an encryption process in an edge device.

9 Claims, 3 Drawing Sheets

ENCRYPTION METHOD AND APPARATUS

CROSS-REFERENCE TO RELATED APPLICATION

This application is a national stage of International Application No. PCT/CN2021/088158 filed on Apr. 19, 2021, which claims priority to Chinese Patent Application No. 202110308565.6 filed on Mar. 23, 2021. The disclosures of these applications are hereby incorporated by reference in their entirety.

TECHNICAL FIELD

The present disclosure relates to the technical field of storage, in particular to an encryption method and an apparatus.

BACKGROUND

With development of communication technology and Internet of Things (IoT) technology, various electronic devices are becoming more and more intelligent. More and more important information has been stored in these edge electronic devices, so that security of this kind of information faces enormous challenge. Therefore, encryption of information is generally required while the information is storing in these edge electronic devices. Traditional software encryption algorithms require a large amount of CPU (central processing unit) computing power as support, and therefore cannot be effectively applied to IoT applications where power consumption and cost are very limited.

Thus, it can be seen that the existing encryption technology has the shortcomings of large requirement for computing power and high power consumption.

SUMMARY

In view of the above-mentioned problems, the present disclosure provides an encryption method and an apparatus which can effectively reduce computing power and power consumption of an encryption process in an edge device.

In a first aspect, the present disclosure provides an encryption method, including: receiving cipher data which is binary data; determining target components in a resistive memory array according to values of respective bits in the cipher data; determining current values generated by respective columns of components according to the target components; and generating key data according to the current values generated by the respective columns of components.

In some embodiments, before determining target components in the resistive memory array according to values of respective bits in the cipher data, the encryption method further includes randomizing resistance values of respective components in the resistive memory array.

In some embodiments, randomizing resistance values of respective components in the resistive memory array includes: comparing resistance values of two adjacent components according to a sequence of addresses of the components and an address of the first component to obtain a comparison result successively; and storing the comparison result in the previous one of the adjacent two components.

In some embodiments, determining target components in a resistive memory array according to values of respective bits in the cipher data includes: determining, according to a position of bit of which value is 1 in the cipher data, components in a row of the resistive memory array that corresponds to the position so as to obtain the target components.

In some embodiments, generating key data according to current values generated by respective columns of components includes: converting the current value generated by each column of components into binary single-bit data; and generating the key data according to the binary single-bit data.

In some embodiments, generating key data according to the binary single-bit data includes: obtaining a sequence of single-bits according to the binary single-bit data; and subjecting the sequence of single-bits to hashing so as to obtain the key data.

In some embodiments, a length of the cipher data is 16 bits, 32 bits or 64 bits.

In a second aspect, the present disclosure provides an encryption apparatus, including: a receiving module, for receiving cipher data which is binary data; a first determination module, for determining target components in a resistive memory array according to values of respective bits in the cipher data; a second determination module, for determining current values generated by respective columns of components according to the target components; and a generation module, for generating key data according to the current values generated by the respective columns of components.

In a third aspect, the present disclosure provides an electronic chip including a resistive memory array and a processor, wherein the processor executes a method as following based on the resistive memory array: receiving cipher data which is binary data; determining target components in a resistive memory array according to values of respective bits in the cipher data; determining current values generated by respective columns of components according to the target components; and generating key data according to the current values generated by the respective columns of components.

In a fourth aspect, the present disclosure provides a computer-readable storage medium on which a computer program is stored, wherein the computer program, when being executed by a processor, implements a method as following: receiving cipher data which is binary data; determining target components in a resistive memory array according to values of respective bits in the cipher data; determining current values generated by respective columns of components according to the target components; and generating key data according to the current values generated by the respective columns of components.

In an encryption method and an apparatus provided by the present disclosure, cipher data is received, which is binary data; then, target components in a resistive memory array are determined according to values of respective bits in the cipher data; and then current values generated by respective columns of components is determined according to the target components; finally, key data is generated according to the current values generated by the respective columns of components, thereby effectively utilizing the resistive memory array to implement a design of Physical Unclonable Function. Besides, the method effectively utilizes the high-density characteristics of the resistive memory array, by which the design of PUF is enabled so as to achieve smaller size and lower power consumption, and therefore can be better applied to edge devices to reduce computing power and power consumption of encryption in the edge devices.

The description as above is only an overview of the technical solutions of the present disclosure, in order to be able to understand the technical means of the present disclosure in a more clear manner, it is applicable to implement them according to the content of the description, and in order to make the above-mentioned and other objectives, features and advantages of the present disclosure more apparent and easier to be understood, the specific embodiments of the present disclosure are set forth as below.

BRIEF DESCRIPTION OF THE DRAWINGS

In order to clearly illustrate the technical solutions of the embodiments of the present disclosure, the accompanying drawings that are used for description of the embodiments will be briefly introduced below. Apparently, the following figures in the description are some embodiments of the present disclosure. For those of ordinary skill in the art, other figures can also be obtained according to these figures without any creative labor involved. In the figures.

DETAILED DESCRIPTION

Exemplary embodiments of the present disclosure will be described in more detail below with reference to the accompanying drawings. Although the accompanying drawings show exemplary embodiments of the present disclosure, it should be understood that the present disclosure can be implemented in various forms and should not be limited to the embodiments set forth herein. Rather, these embodiments are provided to enable a more thorough understanding of the present disclosure and to fully convey the scope of the present disclosure to those of ordinary skill in the art.

Figure 1:
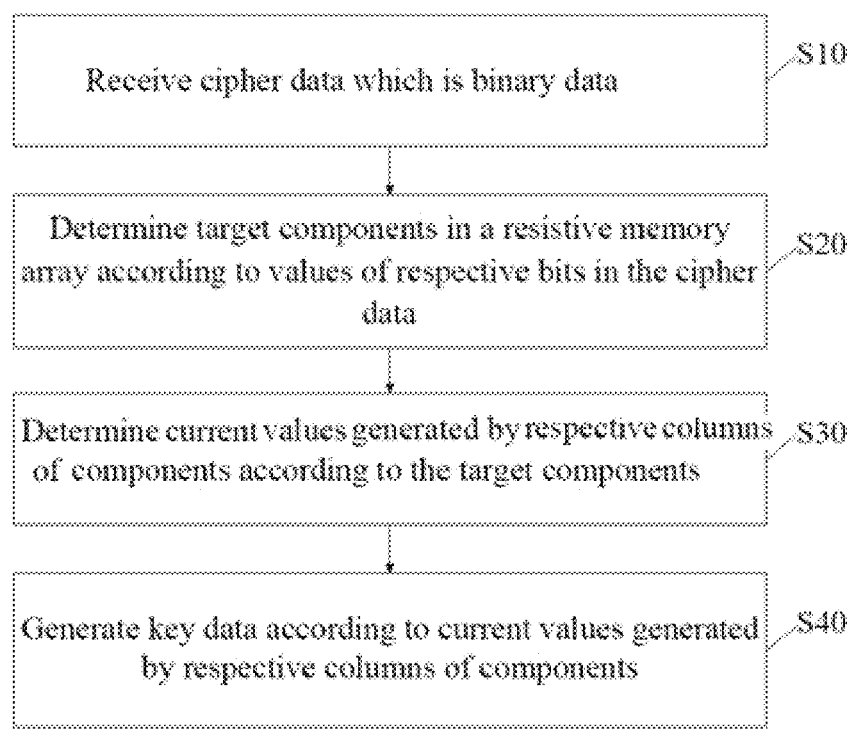
FIG. 1 shows a flowchart of an encryption method according to an embodiment of the present disclosure.

Referring to FIG. 1, it shows a flowchart of an encryption method according to some embodiments of the present disclosure. The method can be implemented based on three-dimensional resistive memory to realize a design of Physical Unclonable Function (PUF). The encryption method includes:

step S10, receiving cipher data which is binary data.

In the step S10, the cipher data is verification data that is carried when data storage is to be performed, and the cipher data corresponds to key data mentioned later in the present embodiment. The cipher data is binary data, and a length of the cipher data can be different according to security requirements or application scenario requirements. For example, the length of the cipher data may be 8 bits, 16 bits, 32 bits, 64 bits, 128 bits, and so on. In this embodiment, in order to coordinate security and power consumption requirements, the length of the cipher data is determined to be 32 bits.

In some embodiments, in order to ensure randomness of resistance values of respective components in a resistive memory array, the resistance values of respective components in the resistive memory array can be randomized before step S20 is performed. In this embodiment, resistance values between adjacent components may be compared and a comparison result may be re-stored in the component then so as to enable random change of the resistance values of the components. In addition, randomization can also be performed by comparing the resistance values between spaced components. Taking the comparison of resistance values between adjacent components as an example, the detailed description is set forth below.

First, according to a sequence of addresses of the components and an address of the first component, the resistance values of two adjacent components are compared to obtain a comparison result successively. For example, the first and second components in the resistive memory array are selected for resistance value comparison, and one comparison result can be obtained thereby. For easy of illustration, in this embodiment, a resistance value of the first component is represented as R1, and a resistance value of the second component is represented as R2. When R1>R2, a comparison result can be represented by 1; when R1<R2, the comparison result can be represented by 0.

Then, the comparison result is stored in the previous one of the adjacent two components. In some embodiments, the comparison result of the first and second components is stored in the first component. Next, comparison of the resistance values between the second and third components is performed, and a comparison result is stored in the second component, and so on. In addition, the comparison result may be stored in the following manner, and the comparison result is stored in the latter one of the two adjacent components. That is, a comparison result of the first and second components is stored in the second component, and then comparison of the resistance values between the second and third components is performed and a comparison result thereof is stored in the third component, and so on. In this way, the physical characteristics of the resistive memory array itself are effectively utilized for randomization of the resistance values of respective components in the resistive memory array, so that security of encryption is improved.

The encryption method further includes step S20: determining target components in the resistive memory array according to values of respective bits in the cipher data.

In the step S20, since the cipher data is binary data, each bit is 0 or 1. Thus, for determining the target components, according to a position of bit of which value is 1 in the cipher data, components in a row of the resistive memory array that corresponds to the position can be determined to be obtained as target components.

Figure 2:
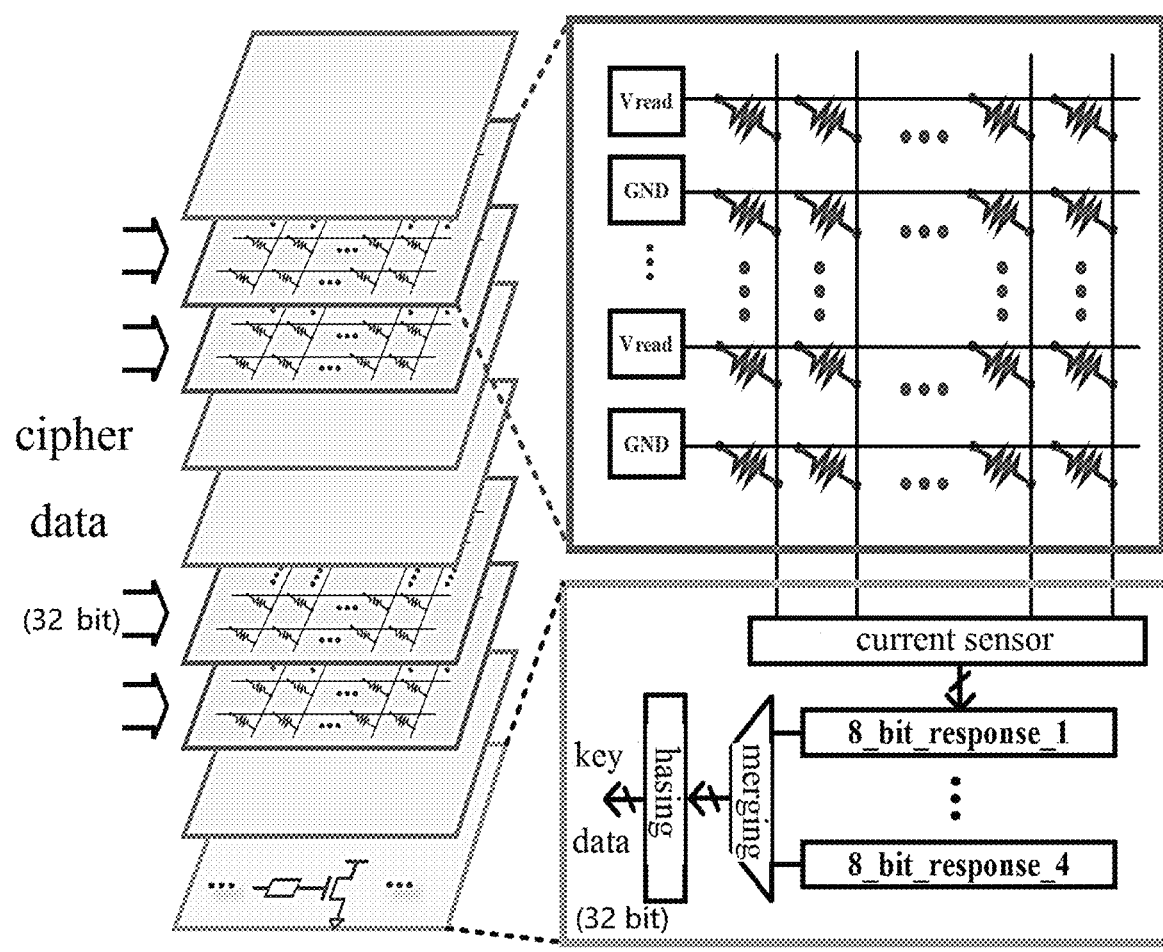
FIG. 2 shows a schematic diagram of the principle of implementing encryption based on a resistive memory array according to an embodiment of the present disclosure.

For example, referring to FIG. 2 and taking cipher data of 32 bits as an example, a schematic diagram of a resistive memory array is shown in FIG. 2, wherein a bottom layer is a circuit structure, and that above the circuit structure is a design of 8 layers. Any 4 layers thereamong can be selected to be designed as an array structure, and each layer is an 8×8 array structure and can represent 8 bits of data. When the value of the first bit of the cipher data is 1, the first row of the first layer of the resistive memory array can be selected; when the value of the second bit of the cipher data is 0, the second row of the first layer is not selected, and so on. When the value of the ninth bit of the cipher data is 1, the first row of the second layer can be selected, and so on. In this way, the target components, i.e., the selected components, can be determined from the resistive memory array.

It should be noted that, in other implementations, the number of layers that the resistive memory array can be designed with is not limited, for example, it may be 2 layers, 4 layers, 6 layers, 8 layers, and so on. Also, an array size of each layer is not limited, for example, the size may be 8×8, 16×16 and so on.

The encryption method further includes step S30: determining current values generated by respective columns of components according to the target components.

In the step S30, since the selected components have been initialized before the step S20, different components might have different resistance values so that respective columns in the resistive memory array may generate varied current values. In this way, the cipher data is converted into current values through the resistive memory array, and each component has been randomized by enabling randomness of its resistance value, thereby realizing an encryption process with higher security.

Not only that, but also the resistive memory array has the characteristics of high-density, by which the design of PUF is enabled to achieve smaller size and lower power consumption and can be better applied on edge devices. Further, a current value is required to be converted into single-bit data, i.e., proceeding to step S40.

The encryption method further includes step S40: generating key data according to the current values generated by respective columns of components.

In the step S40, first, a current value generated by a column of components is converted into binary single-bit data. In some embodiments, the current value of each column may be converted to binary single-bit data, 0 or 1, by a sense amplifier. Taking FIG. 2 as an example, after conversion by the sense amplifiers, the array structure of each layer can output 8 bits of binary single-bit data.

Then, key data is generated according to the binary single-bit data. There are multiple manners to implement this embodiment, and two implementations therein are listed in this embodiment:

1, the binary single-bit data output by the array structure of each layer may be merged together according to a preset order so as to obtain the final key data. Continuing with the example shown in FIG. 2, the array structure of each layer outputs 8 bits of binary data, and outputs of the array structures of four layers are merged in a preset order so as to obtain 32 bits of key data.

2, the binary single-bit data output by the array structure of each layer may be merged together according to a preset order so as to obtain a sequence of single-bits, and then the sequence of single-bits is subjected to hashing so as to obtain the final key data. A processing method of hashing may use an existing scheme, or may be redesigned. For example, a hashing processing method is designed to have an input and an output with the same length. The randomness of the key data can be further improved through hashing, thereby enhancing unpredictability and security.

It should also be further noted that, in some embodiments, the length of the output key data may further be changed by using varied array structures, such as 4×8, 8×16 and so on. When an 8×16 array structure is used, an input length of each array can be 8 bits and an output single-bit data can be 16 bits so that unpredictability of the key data is further improved.

Overall, in an encryption method according to some embodiments of the present disclosure, cipher data is received, the cipher data being binary data; then, target components in a resistive memory array are determined according to values of respective bits in the cipher data; and then current values generated by columns of components is determined according to the target components; finally, key data is generated according to the current values generated by the respective columns of components, thereby effectively utilizing the resistive memory array to implement a design of Physical Unclonable Function. Besides, this method effectively utilizes the high-density characteristics of the resistive memory array, by which the design of PUF is enabled so as to achieve smaller size and lower power consumption, so that communication of edge electronic devices for 5G and IoT networks can be encrypted with a very low cost and power consumption, and security of data can be greatly improved. In addition, due to the high-density characteristics of the resistive memory array, this technical scheme can have advantages of radiation resistance and long service life, and thus can be perfectly applied in harsh environments for a long time.

Figure 3:
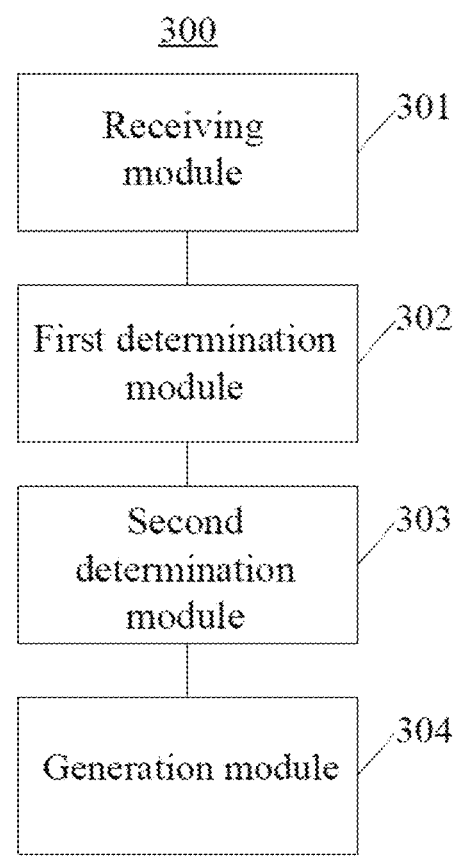
FIG. 3 shows a schematic diagram of a structure of an encryption apparatus according to an embodiment of the present disclosure.

Referring to FIG. 3, in another aspect of the present disclosure, an encryption apparatus 300 is provided. FIG. 3 shows a schematic diagram of a structure of the encryption apparatus 300 according to an embodiment of the present disclosure. The encryption apparatus 300 includes:

a receiving module 301, for receiving cipher data which is binary data; a first determination module 302, for determining target components in the resistive memory array according to values of respective bits in the cipher data; a second determination module 303, for determining current values generated by respective columns of components according to the target components; and a generation module 304, for generating key data according to the current values generated by the respective columns of components.

As an optional implementation, further included is an initialization module which is configured to randomize, before determining target components in the resistive memory array according to values of respective bits in the cipher data, resistance values of respective components in the resistive memory array.

As an optional implementation, said initialization module is further configured to:
   compare resistance values of two adjacent components according to a sequence of addresses of the components and an address of the first component to obtain a comparison result successively; and store the comparison result in the previous one of the adjacent two components.

As an optional implementation, the first determination module 302 is further configured to:
   determine, according to a position of bit of which value is 1 in the cipher data, components in a row of the resistive memory array that corresponds to the position so as to obtain the target components.

As an optional implementation, said generation module 304 is further configured to:
   convert a current value generated by each column of components into binary single-bit data; and generate the key data according to the binary single-bit data.

As an optional implementation, said generation module 304 is further configured to:
   obtain a sequence of single-bits according to the binary single-bit data; and subject the sequence of single-bits to hashing so as to obtain the key data.

As an optional implementation, a length of the cipher data is 16 bits, 32 bits or 64 bits.

It should be noted that implementation of the encryption apparatus 300 according to the embodiment of the present disclosure and the technical effect produced thereby are as the same as that of the foregoing process embodiments. For a brief description, the portion for which description is absent in the apparatus embodiments may refer to the related content in the foregoing process embodiments.

In yet another aspect of the present disclosure, provided is an electronic chip including a resistive memory array and a processor, and the processor executes a method as following based on the resistive memory array:
   receiving cipher data which is binary data; determining target components in the resistive memory array according to values of respective bits in the cipher data;

determining current values generated by respective columns of components according to the target components; and generating key data according to the current values generated by the respective columns of components.

It should be noted that implementation of the electronic chip provided by the embodiment of the present disclosure and the technical effect produced thereby are as the same as that of the foregoing process embodiments. For a brief description, the portion for which description is absent in the apparatus embodiments may refer to the related content in the foregoing process embodiments.

In yet another aspect of the present disclosure provided is a computer-readable storage medium on which a computer program is stored, wherein the computer program, when being executed by a processor, implements a method as following:

receiving cipher data which is binary data; determining target components in the resistive memory array according to values of respective bits in the cipher data; determining current values generated by respective columns of components according to the target components;

and generating key data according to the current values generated by the respective columns of components.

It should be noted that, in the computer-readable storage medium provided by the embodiment of the present disclosure, when the program is executed by the processor, implementation of each executed step and the technical effect produced thereby are as the same as that of the foregoing process embodiments. For a brief description, the portion for which description is absent in the apparatus embodiments may refer to the related content in the foregoing process embodiments.

The wording "and/or" used herein is only an association relationship for describing associated objects, and indicates that there can be three kinds of relationships. For example, A and/or B can refer to three cases that: A exists alone, A and B exist at the same time, and B exists alone. Further, the character "/" herein generally indicates that objects associated contextually are in an "or" relationship; the wording "include" does not exclude the presence of an element or step that is not listed in the claims. The wording "a" or "an" lies ahead an element does not exclude the presence of a plurality of such elements. The present disclosure may be implemented by means of hardware comprising several different elements, and by means of a computer that is programmed suitably. In the claims enumerating several units of means, several of these means may be embodied by one and the same item of hardware. Use of the wording "first", "second", and "third" and the like do not denote any order, and these wordings can be interpreted as names of feature.

As will be appreciated by one skilled in the art, the embodiments of the present disclosure may be provided as a method, system, or computer program product. Therefore, the present disclosure may take the form of an entirely hardware embodiment, an entirely software embodiment, or an embodiment combining software and hardware. Furthermore, the present disclosure may take the form of a computer program product that is embodied on one or more computer-usable storage media (including, but not limited to, disk storage, CD-ROM, optical storage, etc.) having computer-usable program code therein.

The present disclosure is described with reference to flowcharts and/or block diagrams of the method, apparatus (system), and computer program product according to the embodiments of the disclosure. It will be understood that each flow step and/or block in the flowcharts and/or block diagrams, and combinations of flow step and/or block in the flowcharts and/or block diagrams, can be implemented by computer program instructions. These computer program instructions may be provided to a processor of a general purpose computer, special purpose computer, embedded processing machine or other programmable data processing device to produce a machine, such that the instructions executed by the processor of the computer or other programmable data processing device produces means for implementing the functions specified in one or more flow steps in the flowcharts and/or one or more blocks in the block diagrams.

These computer program instructions may also be stored in a computer-readable memory capable of directing a computer or other programmable data processing device to operate in a particular manner, such that the instructions stored in the computer-readable memory result in a manufacturing article comprising instruction means, and the instruction means implement the functions specified in one or more flow steps in the flowcharts and/or one or more blocks in the block diagrams.

These computer program instructions can also be loaded on a computer or other programmable data processing device, so that a series of operational steps are executed on the computer or other programmable device to produce a computer-implemented process, and that the instructions executed on the computer or other programmable device provide steps for implementing the functions specified in one or more flow steps in the flowcharts and/or one or more blocks in the block diagrams.

Although the embodiments of the present disclosure have been described, additional changes and modifications to these embodiments may occur to those skilled in the art once they have known the basic inventive concepts of the disclosure. Therefore, the appended claims are intended to be construed to include the embodiments and all changes and modifications that fall within the scope of the present disclosure.

Apparently, those skilled in the art can make various changes and modifications to the present disclosure without departing from the spirit and scope of the present disclosure. Thus, provided that these modifications and variations of the present disclosure fall within the scope of the claims of the present disclosure and their equivalents, the present disclosure is also intended to cover such modifications and variations.

What is claimed is:

1. An encryption method, comprising:
   receiving cipher data which is binary data;
   determining target components in a resistive memory array according to values of respective bits in the cipher data;
   determining current values generated by respective columns of components according to the target components; and
   generating key data according to the current values generated by the respective columns of components.

2. The method according to claim 1, wherein before determining target components in the resistive memory array according to values of respective bits in the cipher data, the method further comprises:
   randomizing resistance values of respective components in the resistive memory array.

3. The method according to claim 2, wherein randomizing resistance values of respective components in the resistive memory array comprises:
- comparing resistance values of two adjacent components according to a sequence of addresses of the components and an address of the first component to obtain a comparison result successively; and
- storing the comparison result in a previous one of the adjacent two components.

4. The method according to claim 1, wherein determining target components in the resistive memory array according to values of respective bits in the cipher data comprises:
- determining, according to a position of bit of which value is 1 in the cipher data, components in a row of the resistive memory array that corresponds to the position so as to obtain the target components.

5. The method according to claim 1, wherein generating key data according to the current values generated by the respective columns of components comprises:
- converting the current value generated by each column of components into binary single-bit data; and
- generating the key data according to the binary single-bit data.

6. The method according to claim 5, wherein generating key data according to the binary single-bit data comprises:
- obtaining a sequence of single-bits according to the binary single-bit data; and
- subjecting the sequence of single-bits to hashing so as to obtain the key data.

7. The method according to claim 1, wherein a length of the cipher data is 16 bits, 32 bits or 64 bits.

8. An electronic chip comprising a resistive memory array and a processor, wherein the processor executes, based on the resistive memory array, a method of:
- receiving cipher data which is binary data;
- determining target components in a resistive memory array according to values of respective bits in the cipher data;
- determining current values generated by respective columns of components according to the target components; and
- generating key data according to the current values generated by the respective columns of components.

9. A non-transitory computer-readable storage medium storing a computer program thereon, wherein the computer program, when being executed by a processor, implements a method of:
- receiving cipher data which is binary data;
- determining target components in a resistive memory array according to values of respective bits in the cipher data;
- determining current values generated by respective columns of components according to the target components; and
- generating key data according to the current values generated by the respective columns of components.

* * * * *